(12) United States Patent
Vion-Dury (10) Patent No.: US 8,645,428 B2
(45) Date of Patent: Feb. 4, 2014

(54) ARITHMETIC NODE ENCODING FOR TREE STRUCTURES

(75) Inventor: Jean-Yves Vion-Dury, Biviers (FR)

(73) Assignee: Xerox Corporation, Norwalk, CT (US)

( * ) Notice: Subject to any disclaimer, the term of this patent is extended or adjusted under 35 U.S.C. 154(b) by 259 days.

(21) Appl. No.: 13/314,531

(22) Filed: Dec. 8, 2011

(65) Prior Publication Data

US 2013/0151565 A1 Jun. 13, 2013

(51) Int. Cl.
*G06F 7/00* (2006.01)
*G06F 17/30* (2006.01)
*G06F 15/177* (2006.01)
*G06F 15/16* (2006.01)

(52) U.S. Cl.
USPC .......................................... 707/797; 715/234

(58) Field of Classification Search
USPC .......................................... 707/797; 715/234
See application file for complete search history.

(56) References Cited

U.S. PATENT DOCUMENTS

| | | | |
|---|---|---|---|
| 6,334,125 B1 * | 12/2001 | Johnson et al. | 707/797 |
| 7,769,781 B1 | 8/2010 | Huntley | |
| 2004/0107402 A1 * | 6/2004 | Seyrat et al. | 715/513 |
| 2007/0150443 A1 | 6/2007 | Bergholz et al. | |
| 2008/0133583 A1 * | 6/2008 | Artan et al. | 707/999.102 |
| 2009/0222419 A1 * | 9/2009 | Lam et al. | 707/999.003 |
| 2009/0222473 A1 * | 9/2009 | Chowdhury | 707/999.102 |
| 2010/0241950 A1 | 9/2010 | Meunier | |

OTHER PUBLICATIONS

Benoit, et al., "Representing Trees of Higher Degree", 1999, Algorithmica, pp. 1-24.
Jacobson, G., "Space-efficient static trees and graphs". IEEE, 1989, pp. 549-554.
Katajainen, et al., "Tree compression and optimization with applications", International Journal of Foundations of Computer Science, 1990, vol. 1, No. 4, pp. 425-447.
Makinen, E., "A survey on binary tree codings", 1991, The Computer Journal, vol. 34, No. 5, pp. 438-443.
U.S. Appl. No. 13/103,216, filed May 9, 2011, Vion-Dury.
U.S. Appl. No. 13/090,378, filed Apr. 20, 2011, Mensink, et al.
Vion-Dury, J., "Diffing, Patching and Merging XML Documents: toward a Generic Calculus of Editing Deltas", Sep. 2010, ACM Symposium on Document Engineering 2010: pp. 1-11.
Vion-Dury. "A Generic Calculus of XML Editing Deltas", DocEng'11, Sep. 19-22, 2011, pp. 1-8.

* cited by examiner

*Primary Examiner* — Usmaan Saeed
*Assistant Examiner* — Brian E. Weinrich
(74) *Attorney, Agent, or Firm* — Fay Sharpe LLP (57) ABSTRACT

A computer-implemented method and system for encoding (and decoding) nodes of a tree structure are provided. The method includes receiving nodes of a tree structure into memory and, with a processor, for each node of at least one node in the tree structure, creating a numeric encoding by assigning an encoding value to the node, a root node $N_0$ having a fixed encoding value and any other node $N_j$ having an encoding value which is a function of an encoding value of its parent node and an integer k, where $N_j$ is the $k^{th}$ child of the parent node. The encoding enables a path from the node to be traversed to the root node of the tree by applying a decomposition function to the encoding.

27 Claims, 7 Drawing Sheets

ARITHMETIC NODE ENCODING FOR TREE STRUCTURES

BACKGROUND

The exemplary embodiment relates to processing in n-ary trees. It finds particular application in connection with an apparatus and method for representing the structure of an XML document, allowing large tree structures to be stored using less memory than other approaches.

The Extensible Markup Language (XML) is a widely used extensible language which aids information systems in sharing structured data, encoding documents, and serializing data. XML provides a basic syntax for sharing information between different computers, different applications, and different organizations without needing to pass through many layers of conversion. XML documents are stored in the form of a tree where each of a set of nodes is connected directly or indirectly to a root node and each node can have at most one parent node. Data, such as lines of text, is associated with at least some of these nodes. In the case of, for example, books such as manuals, the tree structure can be very large.

It is often desirable to store large XML trees in memory for manipulation (e.g., swapping the position of two sibling nodes, adding nodes, or deleting nodes). If the representation of the tree structure is larger than the available physical memory, then only a portion of the tree can be loaded in memory. Should a user wish to work on a portion of the tree not currently in memory, then the user will have to wait while the portion of the tree not stored in memory is loaded into memory. Therefore, it would be advantageous to have as efficient a representation of the XML tree in memory as possible while still being able to manipulate the tree. Any efficiency in the representation of the XML tree in memory would allow a larger XML tree to be manipulated in memory for a given amount of memory. In addition, a more efficient representation of XML could take up less space in non-volatile storage, for example on a hard disk.

INCORPORATION BY REFERENCE

The following references, the disclosures of which are incorporated herein in their entireties by reference, are mentioned:

U.S. Pub. No. 2010/0241950, filed Mar. 20, 2009, entitled XPATH-BASED DISPLAY OF A PAGINATED XML DOCUMENT, by Meunier; U.S. application Ser. No. 13/090,378, filed Apr. 20, 2011, entitled LEARNING STRUCTURED PREDICTION MODELS FOR INTERACTIVE IMAGE LABELING, by Mensink, et al.; U.S. application Ser. No. 13/103,216, filed May 9, 2011, entitled METHOD AND SYSTEM FOR SECURED MANAGEMENT OF ONLINE XML DOCUMENT SERVICES THROUGH STRUCTURE-PRESERVING ASYMMETRIC ENCRYPTION, by Vion-Dury; U.S. Pub. No. 2007/0150443, filed Dec. 22, 2005, entitled DOCUMENT ALIGNMENT SYSTEMS FOR LEGACY DOCUMENT CONVERSIONS, by Bergholz, et al.; and U.S. Pat. No. 7,769,781, filed May 23, 2007, entitled METHOD FOR LABELING DATA STORED IN SEQUENTIAL DATA STRUCTURES WITH PARAMETERS WHICH DESCRIBE POSITION IN A HIERARCHY, by Huntley.

BRIEF DESCRIPTION

In accordance with one aspect of the exemplary embodiment, a computer-implemented method for encoding nodes of a tree structure is provided. The method includes receiving nodes of a tree structure into memory. With a processor, for each node of at least one node in the tree structure, a numeric encoding is created. This includes assigning an encoding value to the node, a root node $N_0$ having a fixed encoding value and any other node $N_j$ having an encoding value which is a function of an encoding value of its parent node and an integer k, where $N_j$ is the $k^{th}$ child of the parent node. The encoding is output.

In accordance with another aspect of the exemplary embodiment, a system for encoding a tree structure includes a processor and memory which stores instructions which are executed by the processor. The instructions include an encoding component for encoding each node of at least one node of a tree structure, the encoding of a root node $N_0$ having a fixed value and the encoding of any other node $N_j$ having a value which is a function of a value of its parent node and a value k, where $N_j$ is the $k^{th}$ child of the parent node.

In accordance with another aspect of the exemplary embodiment, a computer-implemented method for representing a tree structure includes receiving a tree structure representing an extensible markup language document and, with a processor, for each node to be encoded of at least one node in the tree structure, creating a numeric encoding. This includes assigning an encoding to the node to be encoded, the encoding of a root node $N_0$ being $[[N_0]]=0$ and the encoding of any other node $N_j$ being $[[N_j]]=2^k[[N_i]]+2^{k-1}$ where $N_j$ is the $k^{th}$ child of $N_i$, k being 1 if $N_j$ is a first child. A counter is assigned to the node to be encoded, the counter counting a number of steps from the root node to the node to be encoded along a path which includes for each node in the path, any earlier siblings of the node. An index into a data structure storing a set of indicative set nodes is assigned. The index indicates which node of an indicative set of nodes corresponds to the node to be encoded. The counter and the index are output as a key pair for the node.

In accordance with another aspect of the exemplary embodiment, a decomposition method includes receiving a user selected node of a tree structure and retrieving an encoding for the node from memory, each node of the tree having a unique numerical encoding, a root node $N_0$ of the tree structure having a fixed encoding value and any other node $N_j$ of the tree structure having an encoding value which is a function of an encoding value of its parent node and an integer k, where $N_j$ is the $k^{th}$ child of the parent node. The encoding is decomposed with a decomposition function which identifies a path from the node to a root node of the tree.

DETAILED DESCRIPTION

Aspects of the exemplary embodiment relate to a system and method for arithmetically encoding nodes of a tree structure, such as of an XML document. Aspects also relate to a tree structure whose nodes are encoded by the method, and to a system and method for using the encoding, for example, to manipulate the tree structure, and for decoding a path of a node to its root node, based on the encoding.

Some introductory terminology and notation will help more clearly describe the embodiments.

An ordinal tree T will be syntactically denoted with the following grammar in which $N_i$ stands for any node having unique index $i \geq 0$ and k represents any integer such that $k \geq 1$:

$T ::= N_i[T^1 \ldots T^k]$ node having $k$ ranked children $T ::= N_i$ terminal node Ranking means that the child nodes are ordered as they appear in the input document. An "earlier" child node thus refers to a node which appears before a "later" one of its siblings in the document. Using this grammar, the ranked tree of FIG. 1 is represented as:

$N_0[N_1 N_2[N_3 N_4] N_5]$      Example 1

Figure 1:
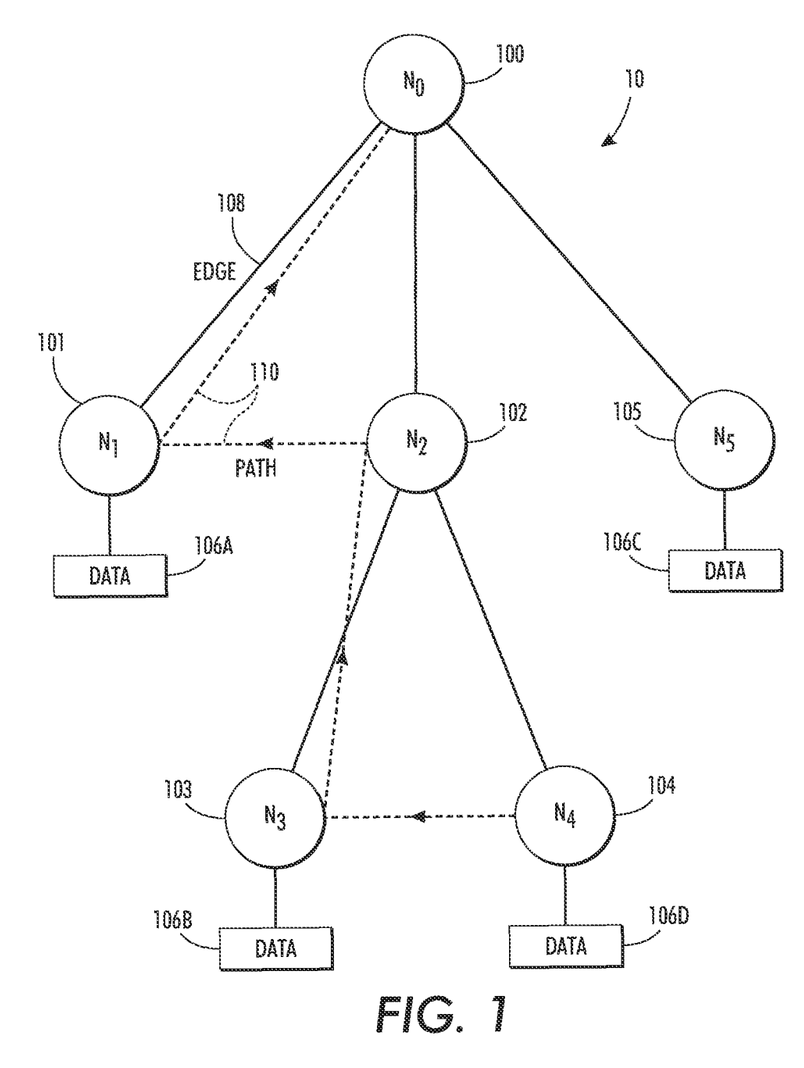
FIG. 1 illustrates an exemplary tree structure.

With reference to FIG. 1 and Example 1, an exemplary tree structure 10 is shown. The tree structure includes a set of nodes 100, 101, 102, 103, 104, and 105. Some of the nodes have data 106A, 106B, 106C, 106D associated with the node. Each node has at most one parent node. The nodes are connected by edges 108 to respective parent and/or child nodes.

A path includes one or more such edges between a child node and a parent or other higher level node.

Each node is given an index, which can be shown as subscripts. In the example tree, the first node (or root) $N_0$ (100), has 3 children: $N_1$ (101), $N_2$ (102), and $N_5$ (105). The open bracket before $N_1$ and the closed bracket after $N_5$ show that they are children of $N_0$. Nodes $N_3$ (103) and $N_4$ (104) are children of node $N_2$ (102). Nodes $N_1$ (101), $N_3$ (103), $N_4$ (104), and $N_5$ (105) are all terminal nodes.

A ranked child relation, written as indicates that node $N_k$ is the $j^{th}$ child of node $N_i$. Without any indicated rank, $N_i \rightarrow N_k$ indicates that $N_k$ is a child of $N_i$. For example, ($N_1$ is the first child of $N_0$) and ($N_4$ is the second child of $N_2$) both hold for the tree of Example 1 and FIG. 1.

Similarly, the descendant relation $N_0 \twoheadrightarrow N_4$ indicates that node $N_4$ is a descendant of $N_0$. A path can also be indicated using this notation, with being shorthand for Path structures without reference to a node can be written as X/Y to indicate the $Y^{th}$ child of the $X^{th}$ child. For example, 2/3 indicates the third child of the second child. In FIG. 1, $N_0$ to $N_3$ has the structure 2/1.

In addition to ranked child and descendant relations, there is also a following sibling relation denoted $N_i \mapsto N_j$, which indicates that $N_i$ and $N_j$ have a common father and that $N_j$ is a later child than $N_i$. Similarly, the n-following sibling function, means that node $N_j$ is the $n^{th}$ node after $N_i$. Syntactically, this function can be represented as:

The Encoding Method

Figure 2:
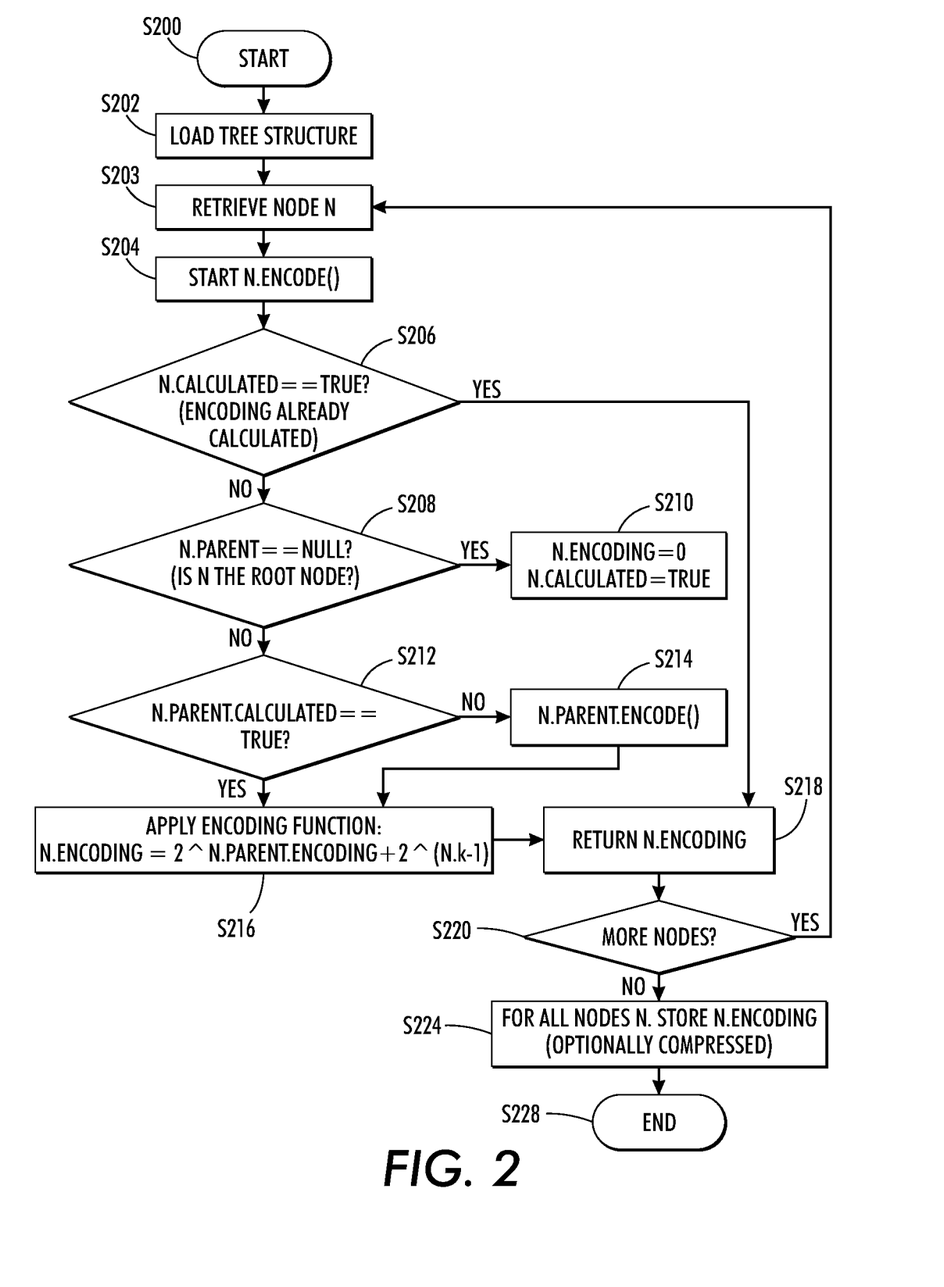
FIG. 2 is a flowchart illustrating an encoding method according to one aspect of the exemplary embodiment.

In one aspect of the exemplary embodiment, a method of computing the encoding of nodes of a tree structure is a recursive method, as shown in FIG. 2. The method begins at S200. At S202, a tree structure to be encoded is input to a computer system 300, such as that shown in FIG. 3, and stored in computer memory 324 or storage 302. For encoding the tree structure, the data 106A, 106B, 106C, 106D associated with the nodes is ignored. At S203, a node to be encoded is retrieved from the tree structure. At S204, an encoding function 306 (FIG. 3) is called, which is a member function of Node N. In addition to the Encode function, the Node data structure has four data members: a pointer to a parent node, Node.parent, which is null if the node is the root node; an integer Node.k, which indicates which child of the parent is this node; Node.encoding, which stores the encoding of the node; and Node.calculated, which is true once a value for encoding has been calculated. The parameter Node.k counts from 1. In S206, the method checks if calculated is true. If so, the encoding has already been calculated and is returned at S218. If there are more nodes to be calculated, processing proceeds to the next node at S220. If the encoding has not been calculated, at S208, the method checks if N is the root and if so sets encoding to 0 at S210, returns encoding at S218, and continues with another node at S220. If the node N is not the root, at S212, the method continues recursively by checking if the parent has been calculated (S212) and, if not, calls N.parent.encoding( ) and then applies the encoding function to the result at S216 to generate a unique encoding value for the node. At S220, the method checks to see if there are more nodes, and if so, returns to S203, otherwise the method continues to S224, where the encoding of the nodes of the tree is stored and/or output to an external device. Optionally, at S224, the encoding is compressed. The method ends at S228. The encoding method shown in FIG. 2 is illustrative. Other methods are discussed below.

In the exemplary embodiment, the encoding method assigns a unique integer to each node of the tree using a recursively defined encoding function 306:

Encoding Function 1

$$[[N_0]] = 0 \quad [[N_j]] = 2^k[[N_i]] + 2^{k-1} \text{ if } N_i \xrightarrow{k} N_j$$

Briefly, this means that the root node is assigned a value of 0 and for all other nodes $N_j$, the value is dependent on the value of k (which indicates which child this is of the parent) and the value which has been assigned to its parent node $N_i$. As will be appreciated, the root node could be assigned a fixed value other than 0.

For example, given the tree in FIG. 1, node $N_2$'s value is computed as follows (k=2):

$$[[N_2]] = 2^2[[0]] + 2^{2-1} = 2$$

Knowing the value for $N_2$, the value of its children can be computed. For example, for node $N_4$ (k=2):

$$[[N_4]] = 2^2[[2]] + 2^{2-1} = 10$$

As will be appreciated, the encodings may be stored as binary numbers. It may be observed that the first child of a parent node (e.g., $N_1$ (101) or $N_3$ (103) in FIG. 1) is always encoded with an odd number because, when k=1, $2^{k-1}=2^0=1$ and $2^k[[N_i]]$ is always an even number for k>1. Note also that each later sibling is a left bitwise shift of the previous sibling. Thus, for example, node $N_4$ has a value of 10 which is 2 times the value of node $N_3$, which is 5. So, using superscripts to represent the encoding values and subscripts to represent the indices, the tree of FIG. 1 and Example 1 is represented by an encoding 304 of:

$$N_0^0[N_1^1 N_2^2[N_3^5 N_4^{10}]N_5^4]$$

Encoding of Example 1

This encoding is unique. For proof, it can be noted that, for all k>0, k'>0, α>0, and β>0:

$$2^k\alpha + 2^{k-1} = 2^{k'}\beta + 2^{k'-1} \Rightarrow \alpha = \beta \wedge k = k'$$

This can be demonstrated by case analysis on k and k' (k=1, k≥2; k'=1, k'≥2) and using the fact that an odd number cannot equate to an even number.

Figure 3:
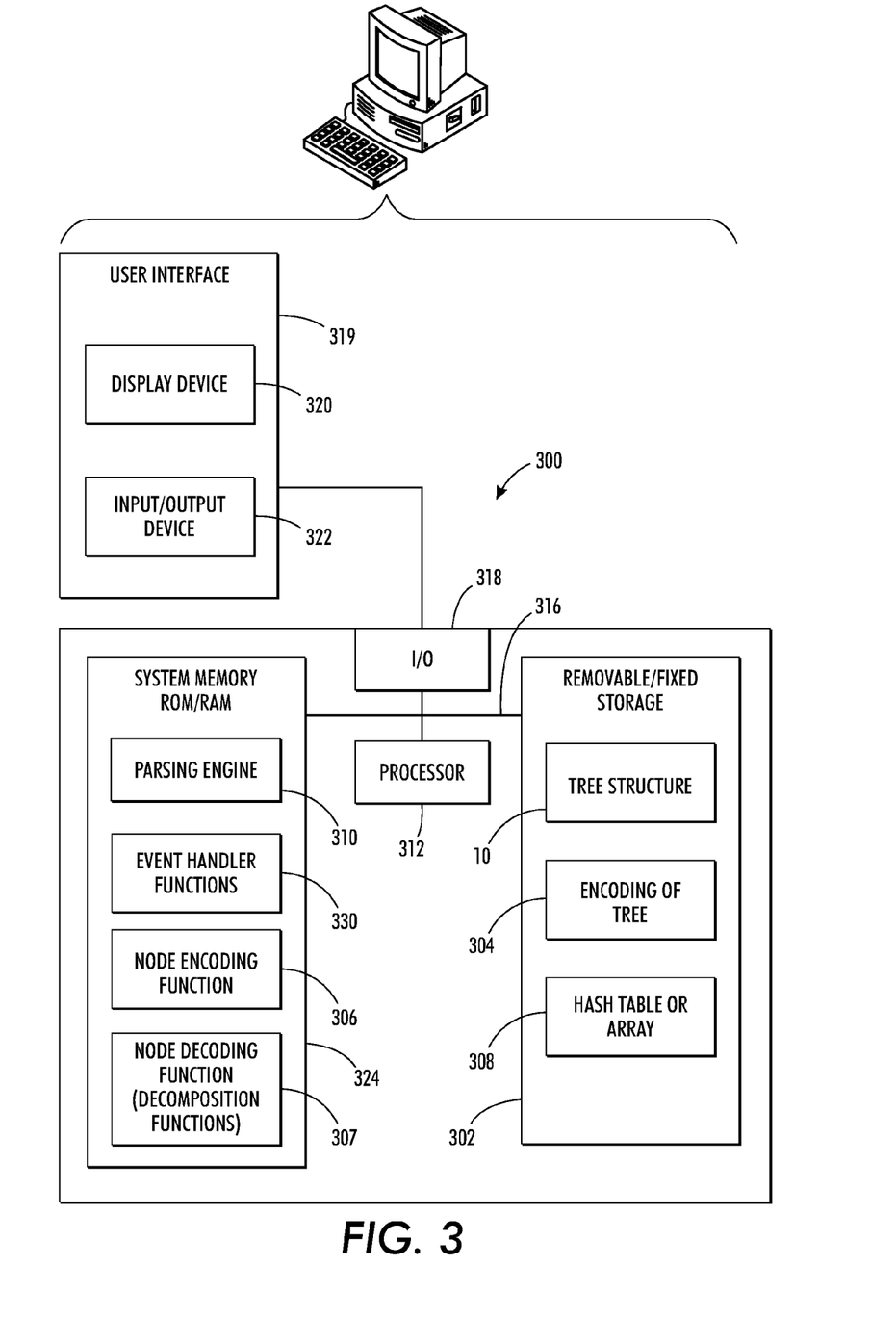
FIG. 3 is a functional block diagram of a system for generating and using the encoding.

In another embodiment, the encoding function may be used in an event-based encoding system where a parsing engine 310 (FIG. 3) reads tags that represent a linearized tree structure and generates events. The events are handled by event handler functions 330 (FIG. 3). An example of such an event-based system is a Simple API for XML (SAX) compliant XML document parser. The parsing engine can be used in an encoding method as illustrated, for example, in FIGS. 4-6. Such methods can be used, for example, for parsing an entire tree and loading its encodings into memory. For Example 1, representing the beginning (opening tag) of each node as +X and the ending (closing tag) of each node as −X, the tree of Example 1 would generate the following events:

$$+N_0+N_1-N_1+N_2+N_3-N_3+N_4-N_4-N_2+N_5-N_5-N_0$$

Example 2

Figure 4:
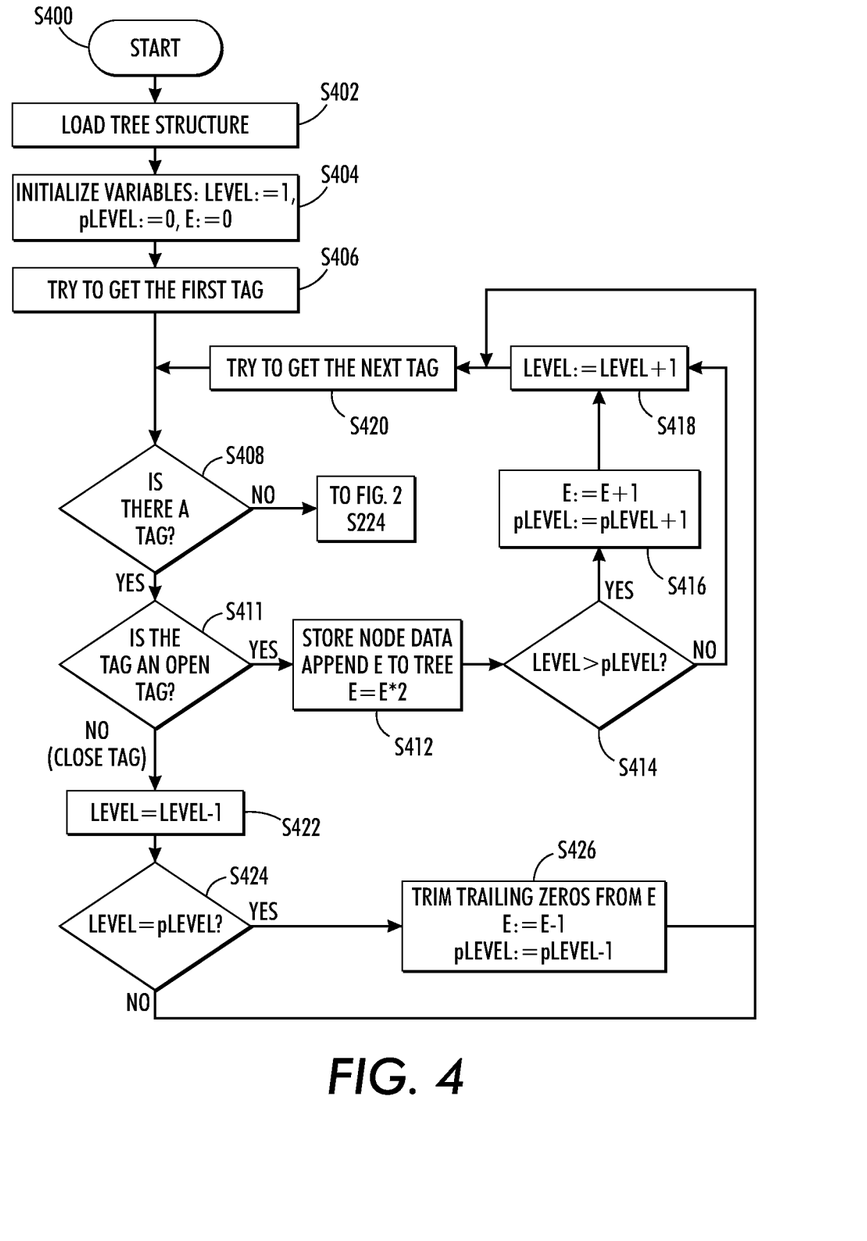
FIG. 4 is a flowchart illustrating an encoding method according to another aspect of the exemplary embodiment.

Pseudo-code of a method to process this event stream using two encoding functions is presented in Algorithm 1. FIG. 4 shows a flow chart of the method which includes the functions execution. To make the code easier to read, it has no error handling and relies on the stream being well-formed with matching opening and closing tags; however, it is to be appreciated that methods to address tagging errors may be incorporated. The function append(list, element) appends element to the end of list.

Algorithm 1
Method for Processing Event Stream with
Event-based Encoding Functions

```
//initialization
nodes :    List (String) = [ ]
tree :     List (Integer) = [ ]
level :    Integer = 1
pLevel :   Integer = 0
E :        Integer = 0
on +X do :
            nodes := append ( nodes, X);       //store name of node
            tree := append  ( tree, E);        //store encoding of node
            E := E*2;
            if level > pLevel do {
                // step down the tree to the first child
                E := E + 1;
                pLevel := pLevel + 1;
            }
            level := level + 1;
on −X do :
            level := level − 1;
            if level == pLevel do {
                // climb the tree to the parent
                while (E mod 2 == 0) do { E := E/2 };
                E := E − 1;
                pLevel : = pLevel − 1;
            }
```

Referring to FIG. 4, the method starts at S400. At S402, a linearized tree structure 10 is loaded, e.g., from non-volatile storage 302 (FIG. 3). At S404, variables are initialized. This is also shown in the pseudo code of Algorithm 1, under the comment "initialization." At S406, the method looks for a first tag of the linearized tree structure. At S408, the method tests to see if the first tag was retrieved. If it is not, perhaps because the tree structure is empty, the method proceeds to S224 (as for FIG. 2) where the encodings are stored. From S224, the method proceeds as described above for FIG. 2.

If there was a first tag, the method tests to see if the tag is an open or close tag at S411. If the tag is an open tag, then the node data is stored and the encoding E is appended to an array corresponding to the tree at S412. Step S412 in FIG. 4 corresponds to the call to the +X function in the pseudocode. Also at step S412, E is multiplied by 2. At step S414, the method tests if level is greater than pLevel, which would indicate that two open tags were seen in a row and that this node is a first child. If so, E and pLevel are incremented at S416, as the method has proceeded one level deeper into the tree. The method then proceeds to S418. If level was not greater than pLevel, then the method proceeds directly to S418. At S418, level is incremented. At this point, the pseudocode exits the +X function of Algorithm 1. The parsing engine 310 attempts to get the next tag at S420, and the method returns to S408, and the method is repeated, until there are no more tags to process.

If at S411, the tag is a close tag rather than an open tag, the method decrements level, which corresponds to the first line of the −X function in the pseudocode. Continuing with the pseudocode and step S424, the method checks if level equals pLevel and, if so, at S426 the method trims bitwise the trailing zeros of E (while (E mod 2==0) do {E:=E/2}) to get the encoding of the parent. Since the encodings are stored as binary numbers, trimming the binary number 100 (corresponding to 4) results in the binary encoding of 10 (corresponding to 2 in decimal numbers). The variable pLevel is also decremented at S426. This is the end of the pseudocode function X. The method then attempts to get the next tag. If level was not equal to pLevel, the method proceeds directly to attempting to get the next tag and the method returns to S408, and the method is repeated, until there are no more tags to process.

As will be appreciated the method of FIG. 4 results in the Encoding Function 1 being applied to the nodes of the tree, although in a stepwise fashion.

The values of the variables from executing the method shown in FIG. 4 and the pseudocode of Algorithm 1 over the tree of Example 1 and FIG. 1 are shown in Table 1. The encoding E for each node is a numerical value which is output when a new node is analyzed by the algorithm and which may be refined before the final encoding is output in the final step.

TABLE 1

Parser Encoding Output After Processing Each Tag

|  | Level | pLevel | E | Node | tree |
|---|---|---|---|---|---|
|  | 1 | 0 | 0 | [ ] | [ ] |
| +$N_0$ | 2 | 1 | 1 | [$N_0$] | [0] |
| +$N_1$ | 3 | 2 | 3 | [$N_0$, $N_1$] | [0,1] |
| -$N_1$ | 2 | 1 | 2 | [$N_0$, $N_1$] | [0,1] |
| +$N_2$ | 3 | 2 | 5 | [$N_0$, $N_1$, $N_2$] | [0,1,2] |
| +$N_3$ | 4 | 3 | 11 | [$N_0$, $N_1$, $N_2$, $N_3$] | [0,1,2,5] |
| -$N_3$ | 3 | 2 | 10 | [$N_0$, $N_1$, $N_2$, $N_3$] | [0,1,2,5] |
| +$N_4$ | 4 | 3 | 21 | [$N_0$, $N_1$, $N_2$, $N_3$, $N_4$] | [0,1,2,5,10] |
| -$N_4$ | 3 | 2 | 20 | [$N_0$, $N_1$, $N_2$, $N_3$, $N_4$] | [0,1,2,5,10] |
| -$N_2$ | 2 | 1 | 4 | [$N_0$, $N_1$, $N_2$, $N_3$, $N_4$] | [0,1,2,5,10] |
| +$N_5$ | 3 | 2 | 9 | [$N_0$, $N_1$, $N_2$, $N_3$, $N_4$, $N_5$] | [0,1,2,5,10,4] |
| -$N_5$ | 2 | 1 | 8 | [$N_0$, $N_1$, $N_2$, $N_3$, $N_4$, $N_5$] | [0,12,5,10,4] |
| -$N_0$ | 1 | 0 | 0 | [$N_0$, $N_1$, $N_2$, $N_3$, $N_4$, $N_5$] | [0,1,2,5,10,4] |

Compression

In one embodiment, the encoding [[N]] disclosed above may be stored in a compressed manner (at S224, FIG. 2). As shown, the encoding [[N]] encodes the path defined by the sequence decomposition to node N from the root node. For every tree 10, there exists a minimal set of nodes that captures the whole topology of the tree. Conceptually, this set can be considered as the nodes of the tree that have no children and no following siblings. By way of example, these are nodes $N_4$ and $N_5$ in the tree shown in FIG. 1. This set of nodes, which will be referred to as the indicative set of a tree, is described as:

$$I(N_0) = \{N_i \mid N_0 \longrightarrow N_i \wedge \neg (\exists\, N_j\; N_i \longrightarrow N_j) \wedge \neg (\exists N_j\; N_i \stackrel{1}{\longmapsto} N_j)\}$$

The representation (encoding) of the tree can be compressed using indicative sets, which is advantageous because the encoding of nodes of the tree can grow quickly. As an example, using 32 bit unsigned integers to encode a node at a depth of 16 levels, the maximum number of sibling nodes that could be encoded is 16.

Because the indicative set captures the whole topology of a tree, nodes occurring along the path from the root to an indicative set member node do not need their entire encoding stored. For any node, it is sufficient to store the encoding for the nearest indicative set member node and a number of unfolding steps from the indicative set member node to the node along a zigzag (stepped) path defined by a decomposition function, discussed later. Briefly, each unfolding step is either a step to a previous sibling or, for first siblings, a step up to the parent. The zigzag path thus includes, for each node on the path, any earlier siblings that the node may have. This zigzag path is labeled 110 in FIG. 1, proceeding from the node $N_4$ (104), which is a member of the indicative set, to its previous sibling $N_3$ (103), to the parent $N_2$ (102), to the previous sibling $N_1$ (101), and then to the parent and root $N_0$ (100). For each node, the corresponding indicative set member, if not itself, is its last sibling or a descendant of its last sibling. In one embodiment, the indicative set is represented by an array of (potentially large) integers for encodings. For each node in the tree, an index into this array and a number of unfolding steps from the indicative set member is stored. These two numbers, the index and the number of unfoldings, suffices to represent the entire encoding of any node in the tree. Thus, for example, for node $N_3$ the indicative set member (its last sibling) is $N_4$. There is one unfolding step between them, since it is the next sibling. So node $N_3$ has as its index $N_4$ (whose encoding is 10), with 1 as the number of unfolding steps, which when performed on the number 10 gives 5 as the encoding for node $N_3$.

While an array is exemplified, it is to be appreciated that the node encodings can be stored in any suitable data structure 308 (FIG. 3), such as a hash table, array, or map of nodes. It may be noted that if most of the nodes of the tree have the same number of children and no nodes have more than that number, an array may be an efficient implementation, but with many trees, the array may be too sparsely populated to be efficient. Without compression, a key to the hash table or index into the array could be the encoding itself. With compression, in one embodiment, a key pair formed from both the index into the indicative set and the number of unfoldings may be used as a key to the hash table or other data structure 308.

Encoding with Compression

Figure 5:
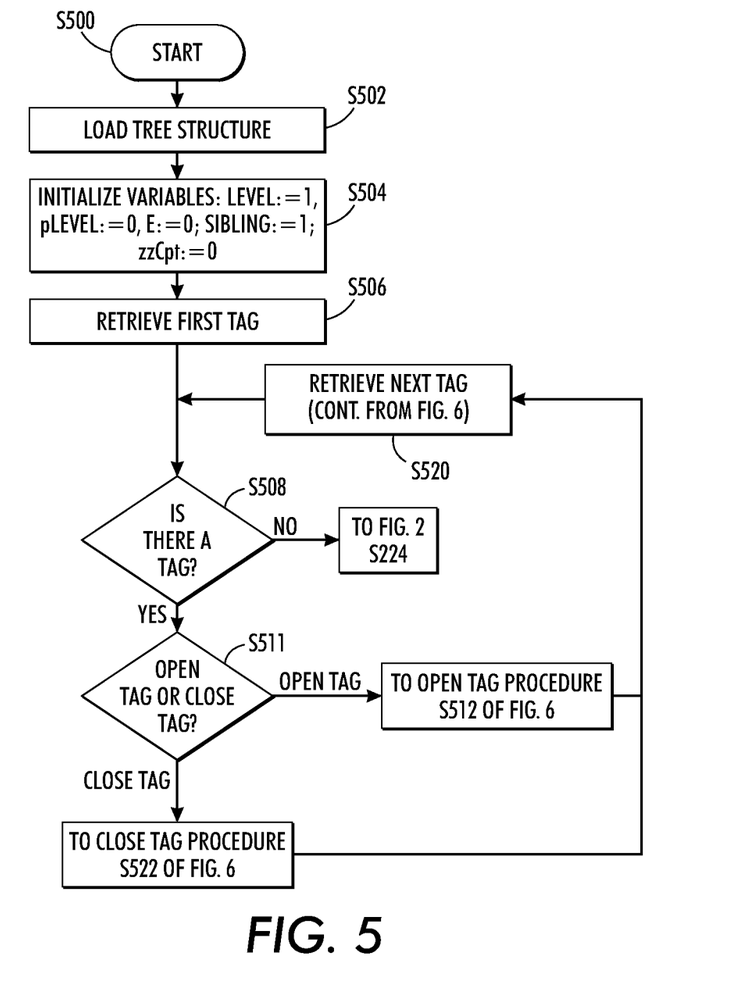
FIGS. 5 and 6 are flowcharts showing a method for encoding with compression according to another aspect of the exemplary embodiment.
Figure 6:
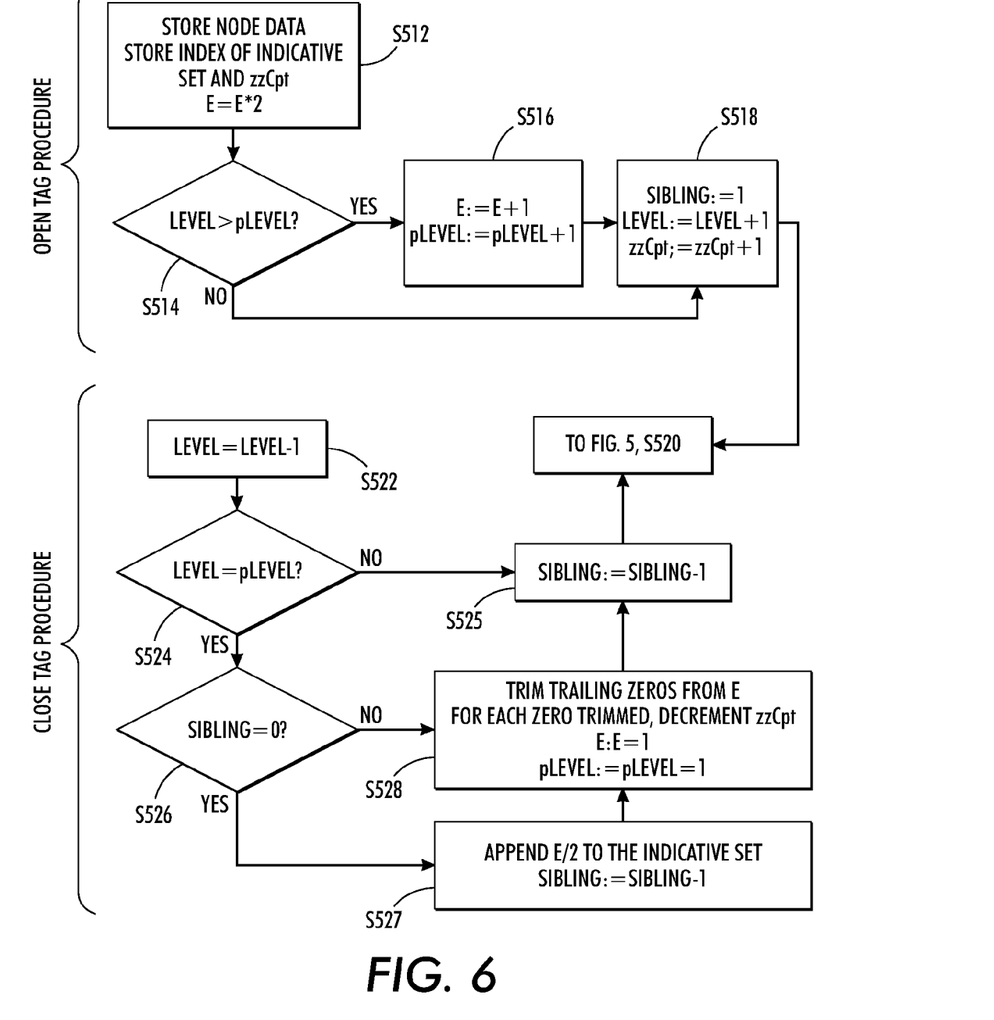

In one embodiment, the compression may be performed as part of the encoding step. FIGS. 5 and 6 show a flow chart of an exemplary embodiment of a method to assign encoding to nodes of a tree with compression, and Algorithm 2 shows example pseudocode to perform the method. This method can be applied to a linear representation of a tree, as illustrated in Example 2. The "+X" and "−X" functions of Algorithm 2 are handler functions called by a parsing engine 310 that can parse the linearized tree and generate events, as for the embodiment of FIG. 4.

The method starts at S500. In step S502, the tree structure is loaded by a parsing engine 310 (FIG. 3). At S504, variables are initialized, corresponding to the pseudocode under the comment "initialization" of Algorithm 2. The parsing engine attempts to find a first tag at S506 and tests if there is a tag at S508. If there is no tag, the tree is empty and the method continues to S224, where the encoding of the nodes of the tree is stored and/or output to an external device. If there is a tag, the method tests whether it is an open or a close tag at step S511.

If the tag is an open tag, the method proceeds to the open tag procedure shown in FIG. 6, starting at S512. The open tag step corresponds to the "+X" function in the pseudocode of Algorithm 2.

If the tag is a close tag, the method proceeds to the close tag procedure, also depicted in FIG. 6, starting at S522. The close tag step corresponds to the "−X" function in the pseudocode of Algorithm 2.

Turning now to FIG. 6, the open tag procedure starts at step S512 where the associated node data is stored. If the tree were, for example, a linearized tree holding an XML document, the associated node data may include the name of the node and any attribute data. For XML leaf nodes, the element data 106A, 106B, 106C, 106D could also be stored to avoid having an extra layer of depth for the text data of leaf nodes. The index into the indicative set and the number of zigzag unfoldings (denoted zzCpt) is also stored at step S512. Additionally, E, the encoding, is multiplied by two.

At step S514, the method tests whether level is greater than pLevel, indicating that this node is a first child. If level is greater than pLevel, then at step S516, E and pLevel are incremented. Processing then proceeds to step S518, where sibling is set to 1, level is incremented, and zzCpt is incremented. This corresponds to the end of the "+X" function. Processing then proceeds to step S520 (FIG. 5) where the parser 310 attempts to retrieve the next tag.

It should be noted that in this method it is advantageous to calculate the number of unfolding steps (zzCpt) from the root rather than from the leaf. If the total number of unfolding steps to an indicative set member is stored with the indicative set element's encoding, the number of unfolding steps can be calculated by subtracting the unfoldings zzCpt to the node from unfoldings to the indicative set element.

In the exemplary embodiment, the index to the member of the indicative set is assigned to corresponding nodes before the encoding of the member of the indicative set has been calculated. This can be done because the next index into the indicative set array will correspond to the nodes currently being parsed. For example, if node $N_4$ of FIG. 1 had just been parsed and $N_5$ was now being parsed, at S512, the index into the indicative set array would be "1" because the $0^{th}$ element, $N_4$, had just been stored with an encoding of 10.

Continuing with FIG. 5, in the case that the parser retrieved a tag at step S520 that exists ("yes" is output at S508) and is a close tag ("close tag" is output at S511), the method continues at S522 of FIG. 6. At S522, which corresponds to the beginning of the "−X" function in Table 3, level is decremented to reflect the closing tag. If level does not equal pLevel, sibling is decremented at S525 and the method continues to S520 (FIG. 5). If level equals pLevel, then at S526, sibling=0 is tested. If sibling is zero, then the node being closed was a last sibling, so, at S527, E/2 is added to the indicative set and sibling is decremented. Regardless of whether sibling was zero or not, at S528, the trailing zeros of E (in binary) are trimmed by testing "E mod 2" until E ends in a 1. This can be thought of as "undoing" each following sibling to get back to the first sibling's encoding. For each following sibling, a zero was added bitwise to the encoding (by multiplying by two). Once a close tag is encountered, this must be "undone" to get back to the parent's encoding. For each zero trimmed, zzCpt is also decremented to back up the number of unfoldings. Once the zeros are trimmed to get the first sibling's encoding, subtracting 1 from E yields the encoding of the parent, completing the adjustments to E corresponding to the closing tag. Also at step S528, pLevel is decremented. Processing continues at step S525 and then to S520 as already discussed.

As those skilled in the art will understand, the methods of FIGS. 4-6 could be applied to any linearized tree such as an XML document parsed by a SAX parser.

Algorithm 2
Method for Parser Encoding Functions with Compression

```
//initialization
nodes:        List (String) = [ ]
tree:         List (Integer Integer) = [ ]
indicative:   List (Integer) = [ ]
sibling :     Integer = 1
zzCpt :       Integer = 0
level :       Integer = 1
pLevel :      Integer = 0
E :           Integer = 0
on +X do :
        nodes := append( nodes, X); //store name of node
        //store index into indicative set and zigzag unfoldings
        tree := append ( tree, <length(indicative) , zzCpt> );
        E := E*2;
        if level > pLevel do {
            // step down the tree to the first child
            E := E + 1;
            pLevel := pLevel + 1;
        }
        sibling := 1;
        level := level + 1;
        zzCpt := zzCpt + 1;
on -X do :
        level := level - 1;
        if level == pLevel do {
            // climb the tree to the parent
            if (sibling == 0) do {
                indicative := append(indicative, E/2);
                sibling := sibling - 1;
            };
            while (E mod 2 == 0) do {
                E := E/2;
                zzCpt := zzCpt - 1;
            };
            E := E - 1;
            pLevel := pLevel - 1;
        }
        sibling := sibling - 1;
```

The values of the variables from executing the pseudocode over the tree of Example 2 and FIG. 1 are shown in Table 2.

TABLE 2

| | Parser Encoding Output | | | |
|---|---|---|---|---|
| | sibling | zzCpt | indicative | tree |
| | 1 | 0 | [ ] | [ ] |
| $+N_0$ | 1 | 1 | [ ] | [(0,0)] |
| $+N_1$ | 1 | 2 | [ ] | [(0,0), (0,1)] |
| $-N_1$ | 0 | 2 | [ ] | [(0,0), (0,1)] |
| $+N_2$ | 1 | 3 | [ ] | [(0,0), (0,1), (0, 2)] |
| $+N_3$ | 1 | 4 | [ ] | [(0,0), (0,1), (0, 2), (0,3)] |
| $-N_3$ | 0 | 4 | [ ] | [(0,0), (0,1), (0, 2), (0,3)] |

TABLE 2-continued

Parser Encoding Output

| sibling | zzCpt | indicative | tree |
|---|---|---|---|
| $+N_4$ | 1 | 5 | [ ] | [(0,0), (0,1), (0, 2), (0,3), (0,4)] |
| $-N_4$ | 0 | 5 | [ ] | [(0,0), (0,1), (0, 2), (0,3), (0,4)] |
| $-N_2$ | −2 | 3 | [10] | [(0,0), (0,1), (0, 2), (0,3), (0,4)] |
| $+N_5$ | 1 | 4 | [10] | [(0,0), (0,1), (0, 2), (0,3), (0,4), (1,3)] |
| $-N_5$ | 0 | 4 | [10] | [(0,0), (0,1), (0, 2), (0,3), (0,4), (1,3)] |
| $-N_0$ | −2 | 1 | [10,4] | [(0,0), (0,1), (0, 2), (0,3), (0,4), (1,3)] |

Figure 7:
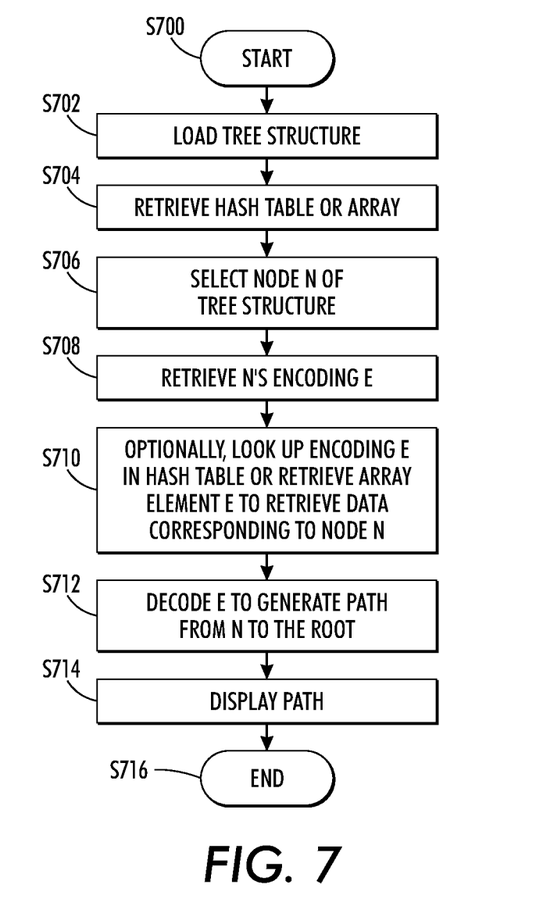
FIG. 7 illustrates a method of decoding a path of a node based on its encoding.

Once the encoding 304 of a tree structure 10 (e.g., generated according to any of the methods shown in FIGS. 2 and 4-6), and any associated hash table or array 308 have been stored, the encoding can be used in a method of use, as illustrated in FIG. 7.

The method begins at S700. At S702, an encoding for a tree structure 10 is retrieved. At S704, the hash table or array 308, if any, may also be retrieved. At S706, a node N may be selected by a user. At S708, the encoding E of node N is retrieved. At S710, data corresponding to node N may be retrieved by looking up E in the hash table or by retrieving the Eth element of the array. At S712, E is decoded using decomposition functions 307 stored in memory 324 or 302 (FIG. 3, described below) to generate the path from node N to the root of the tree. At S714 the path may be displayed to the user. The user may manipulate the tree, e.g., by removing or adding one or more nodes or changing their position(s) in the tree. A new encoding for the nodes of the tree can be generated automatically by the system, using any of the encoding methods described above. The method ends at S716.

Decodinq the Relative Path (S712)

The encoding of a particular node contains the relative path from the node to its root. The decoding of this encoding may be performed with a decoding function 307 to reconstruct the path. The decoding function may be a sequence decomposition function S defined as:

$$S(\beta) = \begin{cases} 0 & \text{if } \beta = 0 \\ \beta, S\left(\frac{\beta}{2}\right) & \text{if } \beta \text{ even} \\ \beta, S\left(\frac{\beta-1}{2}\right) & \text{if } \beta \text{ odd} \end{cases}$$

The above function returns the encodings of the nodes going from a node encoded by β to the root along a path going from a node to its preceding sibling, repeating this until the first sibling is reached, then to the parent of that sibling, and then repeating the process until the root node, encoded by 0, is reached. For example, for the tree of FIG. 1 and node encodings ($N_0^0[N_1^1 N_2^2[N_3^5 N_4^{10}] N_5^4]$), the code 10 assigned to node $N_4$ can be decomposed into the sequence S(10)=(10, 5, 2, 1, 0) using the above decoding function. This path goes from the leaf node $N_4$ to the root in a zigzag pattern 110 shown in FIG. 1. Each step, which could be to either a previous sibling or a parent, is referred to as an "unfolding." Using the notation described above, this path can be written from the root to the leaf node as:

$$N_0^0 \xrightarrow{1} N_1^1 \xrightarrow{1} N_2^2 \xrightarrow{1} N_3^5 \xrightarrow{1} N_4^{10}$$

The sequence decomposition of the unique encoding of the node allows the recursive enumeration of all preceding sibling nodes and parent nodes along the path to the root node.

Properties of Encodings

If two nodes of two different trees have the same path to their respective root nodes, they will have the same encoding. To illustrate this, let "≈" define equivalence between an encoding and the path described by the sequence decomposition. This equivalence relation can be defined:

$$\overline{0 \approx 1} \qquad \text{equivalence of root}$$

$$\frac{A = 2\beta \quad \beta \approx X/(k-1)}{A \approx X/k} \qquad \text{equivalence when } k \text{ is even}$$

$$\frac{A = 2\beta + 1 \quad \beta \approx X}{A \approx X/1} \qquad \text{equivalence when } k \text{ is odd}$$

In the above equivalence relation, A is an encoding, β is the encoding after a decomposition, and k is the last element of the path. That is, if X is the path 2/2/2, and Y is the path 2/2, and k is 2, X can be written as Y/k.

Applying the equivalence relation to 10≈1/2/2 shows that 10 is equivalent to the path 1/2/2:

$$10 = 2 \times 5 \cfrac{5 = 2 \times 2 + 1 \cfrac{2 = 2 \times 1 \cfrac{\overline{0 \approx 1}}{1 \approx 1/1}}{2 \approx 1/2}}{5 \approx 1/2/1}$$
$$10 \approx 1/2/2$$

The node encoding allows checking of useful topological properties over nodes of the tree arithmetically. The sibling relation can be verified by computing the greatest common divisor (gcd). The gcd of two sibling nodes must be a power of 2:

$$\text{sibling}(N_i^x, N_j^y) \Leftrightarrow \exists n > 0 \left| \frac{\max(x, y)}{\min(x, y)} = 2^n \right.$$

Additionally, the earlier sibling will have the lower encoding value. Hence, the following sibling function $N_i \mapsto N_j$ can be checked directly through successive integer divisions by two. This is computationally efficient in base two systems because it is only a bitwise right shift.

followingSibling($N_i^x, N_j^y$) ⇔ ∃n>0|y/x=$2^n$ followingSibling($N_i^x, N_j^y, n$) ⇔ y/x=$2^n$ Because the following sibling always has a higher encoding, this can be used to optimize algorithms when many nodes are to be checked. By construction, a node $N_j$ is a child of node $N_i$ if [[$N_j$]] is a multiple of [[$N_i$]]+1. Moreover, the multiple must be a power of 2:

$$\text{child}(N_i^x, N_j^y) \Leftrightarrow \exists n \geq 0 \;\Big|\; \frac{y}{2x+1} = 2^n$$

$$\text{parent}(N_i^x, N_j^y) \Leftrightarrow \exists n \geq 0 \;\Big|\; \frac{x}{2y+1} = 2^n$$

The descendant relation can be recursively built upon on the child relation:

$$\text{desc}(N_i^x, N_j^y) \Leftrightarrow \exists N_k^z | \text{child}(N_i^x, N_k^z) \vee \text{desc}(N_k^z, N_j^y)$$

$$\text{desc}(N_i^x, N_j^y, 1) \Leftrightarrow \text{child}(N_i^x, N_j^y)$$

$$\text{desc}(N_i^x, N_j^y, n+1) \Leftrightarrow \exists N_k^z | \text{child}(N_i^x, N_k^z) \vee \text{desc}(N_z^z, N_j^y, n)$$

Conversely, the ascendant relation can be recursively built on the parent relation:

$$\text{asc}(N_i^x, N_j^y) \Leftrightarrow \exists | \text{parent}(N_i^x, N_k^z) \vee \text{asc}(N_k^z, N_j^y)$$

$$\text{asc}(N_i^x, N_j^y, 1) \Leftrightarrow \text{parent}(N_i^x, N_j^y)$$

$$\text{asc}(N_i^x, N_j^y, n+1) \Leftrightarrow \exists | \text{parent}(N_i^x, N_k^z) \vee \text{asc}(N_k^z, N_j^y, n)$$

As shown, all major relations can be translated as arithmetic operations over the numerical code. These operations are highly suitable to sustain fast computation algorithms over n-ary tree structures, such as XML documents.

The methods illustrated in any of FIGS. 2 and 4-7 and Algorithms 1 and 2 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing any of the flowcharts shown in FIGS. 2 and 4-7, can be used to implement the method for encoding and/or decoding a tree structure.

System for Encoding/Decoding Tree Structures

With reference once more to FIG. 3, a functional block diagram of a computer system 300 suitable for performing one or more of the exemplary methods is shown. As will be appreciated separate computer systems may be configured for the encoding and decoding, however, for convenience a combined system is shown. The illustrated computer system 300 includes a processor 310, which controls the overall operation of the computer system 300 by execution of processing instructions which are stored in memory 324 connected to the processor 312 by a bus 316. The system 300 may include multiple processors, wherein each processor is allocated to processing particular (sets of) instructions. Computer system 300 also includes one or more interfaces to connect the system to external devices, including a user input output (I/O) interface 318. The I/O interface may communicate with a user interface 319 including one or more of a display device 320, for displaying information to users, and a user input device 322, such as a keyboard or touch or writable screen, and/or a cursor control device, such as a mouse, trackball, or the like, for inputting instructions and communicating user input information and command selections to the processor.

The various components of the computer 300 may all be connected by the bus 316. The processor 312 executes instructions stored in memory 324 for performing the method outlined in one or more of FIGS. 2 and 4-7. These may include a parsing engine 310 (discussed above) such as a SAX compliant parser, event handler functions 330 for reacting to events generated by the parser, a node encoding component 306 to generate the encoding 304 for at least one node of the tree 10, and a node decoding component 307, for decoding the encoding of a selected node. These software components may be stored in memory storage unit 324, which is communicatively connected with the processor 312 by the bus 316.

The computer system 300 may be a PC, such as a desktop, a laptop, palmtop computer, portable digital assistant (PDA), server computer, cellular telephone, pager, or other computing device or devices capable of executing instructions for performing the exemplary method or methods described herein.

The storage unit 302 may be removable or fixed. The storage unit may store an input tree structure 10, for example a linearized XML document. The storage unit 302 may also store a data structure 304 representing the generated encodings and a data structure 308 such as a hash table for identifying the indicative set member for a node and the number of unfoldings, in the case of compression.

The memory 324 and storage 302 may be separate or combined and may represent any type of tangible computer readable medium such as random access memory (RAM), read only memory (ROM), magnetic disk or tape, optical disk, flash memory, or holographic memory. In one embodiment, the memory 324, 302 comprises a combination of random access memory and read only memory. In some embodiments, the processor 312 and memory 324 may be combined in a single chip. The I/O interface 318 of the computer system 300 may include a network interface to communicate with other devices via a computer network, such as a local area network (LAN), a wide area network (WAN), or the internet, and may comprise a modulator/demodulator (MODEM). The digital processor 312 can be variously embodied, such as by a single-core processor, a dual-core processor (or more generally by a multiple-core processor), a digital processor and cooperating math coprocessor, a digital controller, or the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

While the system and method have been described with particular reference to an XML document, it will be appreciated that the methods disclosed herein are also applicable to other tree-based document models, such as, for example, SGML (of which XML is a document type or subset) and HTML (XHTML being a subset of XML). The method would also be useful for general tree structures other than document models.

Storage Requirements with Compression

In one embodiment, the above encoding and compression methods are applied to an XML document, allowing the XML document to be stored using less memory and allow larger trees for a given amount of memory. As a general guideline, if a tree has a depth of G levels and the maximum number of children at each (non-terminal) node is D (degree), the maximum number of nodes of the tree can be computed as:

$$N = 1 + D + D^2 + \ldots + D^G = \frac{1 - D^{G+1}}{1 - D}$$

On such trees, the cardinality of the indicative set is $|I|=D^{G-1}$, and the size of the code to store each node element of the indicative set is $\log(D+G)$ bits. This provides a worst case estimate, as it assumes that the nodes at the maximum depth also have the maximum degree. In order to store the topology of the tree with N nodes and the data associated with each node, the memory stores a table of N node pointers, a table of N index pairs for storing the indicative set and number of unfoldings corresponding to each node, and the indicative set itself.

Assuming a 32 bit computing system, summing these together yields (in bytes):

$$\text{Storage} = 4N + N\left(\left\lceil\frac{lg|I|}{8}\right\rceil + \left\lceil\frac{lg(G+D)}{8}\right\rceil\right) + |I|\left\lceil\frac{lg(D+G)}{8}\right\rceil$$

Conventionally, an array of N elements can be used to store a tree structure of N nodes. Each element of the array will have at least 2 pointers, one for the node data and one for a data structure to capture the tree structure. If the data structure to capture the tree structure is itself an array, those arrays will contain an element to indicate the size of the array, generally also the size of a pointer. The total elements in all the children-storing arrays will be N−1, so the total space used by the pointers, size element, and children arrays will be 2N+N+(N−1)=4N−1. Using linked lists to store the children nodes utilizes two pointers per child node but avoids the size pointer, yielding a size of 2N+2*(N−1), but if doubly linked lists are used the size becomes 6N−3. Of these implementations, only doubly linked lists provide sibling relationship predicates. The memory requirements of a doubly linked list implementation can be compared to the current embodiment using encodings. The calculated memory requirements in megabytes of a linked list implementation and the exemplary encoding embodiment are shown in the Table 3 for trees of maximum depth G and maximum degree D. Table 3 includes a column showing the ratio of the memory consumed by the encoding to the memory consumed by a linked list method. As can be seen, the memory advantage of the encoding is stable as the depth and degree increases, using about 40% of the memory of the linked list implementation.

TABLE 3

Exemplary Memory Storage Beqvirements

| G | D | N | LINKED LIST (MEGA-BYTES) | EXEMPLARY ENCODING (MEGABYTES) | RATIO OF (ENCODING/ LINKED LIST) |
|---|---|---|---|---|---|
| 5 | 16 | 1118481 | 21 | 8 | 0.35293 |
| 5 | 19 | 2613660 | 50 | 20 | 0.40249 |
| 6 | 12 | 3257437 | 62 | 25 | 0.40382 |
| 6 | 19 | 49659541 | 947 | 381 | 0.40249 |
| 7 | 8 | 2396745 | 46 | 19 | 0.40547 |
| 7 | 14 | 1.14E+08 | 2165 | 873 | 0.40332 |
| 7 | 19 | 9.44E+08 | 17996 | 8143 | 0.45249 |

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for encoding nodes of a tree structure, the method comprising:
receiving nodes of a tree structure into memory;
with a processor, for each node of at least one node in the tree structure, creating a numeric encoding, comprising:
assigning an encoding value to the node, a root node $N_0$ having a fixed encoding value of $[[N_0]]=0$, and any other node $N_j$ having an encoding value which is a function of an encoding value of its parent node and an integer k, where $N_j$ is the $k^{th}$ child of the parent node $N_i$, the function assigning the encoding value to the node being $[[N_j]]=2^k[[NJ_i]]+2^{k-1}$; and
outputting the encoding.

2. The method of claim 1, wherein each of the nodes of the tree structure has a unique value as is encoding which when decomposed, identifies a path from the node to the root node.

3. The method claim 1, wherein the tree structure is a linearized tree structure of ordered nodes.

4. The method of claim 1, wherein the tree structure is a representation of an extensible markup language document.

5. The method of claim 1, further comprising verifying that a node with a higher encoding is a sibling of a node with a lower encoding by trimming the trailing zeros from the binary encoding of the node with the higher encoding to produce a trimmed encoding and verifying that the trimmed encoding is equivalent to the lower encoding.

6. The method of claim 1, further comprising using the encoding as a key to a data structure which stores data associated with the node.

7. The method of claim 1, wherein the encoding is performed for each of a plurality of nodes of the tree.

8. The method of claim 1, wherein the encoding is performed for the root node and for each node of the tree which has no following siblings and no children.

9. The method of claim 1, further comprising storing the encoding of a node in a data structure as an index of an indicative set member, the indicative set member having a stored encoding value, and a number of unfoldings between the indicative set member and the node.

10. The method of claim 1, wherein for each node of at least one node in the tree structure, the encoding is stored as a pair, the pair comprising:
an index indicating the position of the node along a path from the root to a leaf node; and an index to an array containing indicative set nodes, the index corresponding to the leaf node.

11. The method of claim 10, wherein the pair serves as a key to a hash table containing node data.

12. The method of claim 1, further comprising decomposing the encoding to construct a path from an encoded node to its root node.

13. The method of claim 12, wherein the decomposition is performed using a sequence decomposition function.

14. The method of claim 13, wherein the sequence decomposition function S is of the form:

$$S(\beta) = \begin{cases} 0 & \text{if } \beta = 0 \\ \beta, S\left(\frac{\beta}{2}\right) & \text{if } \beta \text{ even} \\ \beta, S\left(\frac{\beta-1}{2}\right) & \text{if } \beta \text{ odd} \end{cases}$$

where $\beta$ represents the numerical value of the encoding.

15. A computer program product comprising a non-transitory storage medium which stores instructions which, when executed by a computer, perform the method of claim 1.

16. A system comprising memory which stores instructions for performing the method of claim 1 and a processor in communication with the memory for executing the instructions.

17. The system of claim 16, further comprising a display for displaying the encoding.

18. The system of claim 16, further comprising a tree parser which reads the tree structure and generates events corresponding to nodes which are encoded by the encoding function.

19. A computer-implemented method for representing a tree structure, the method comprising:
  receiving a tree structure representing an extensible markup language document;
  with a processor, for each node to be encoded of at least one node in the tree structure, creating a numeric encoding, comprising:
    assigning an encoding to the node to be encoded, the encoding of a root node $N_0$ being $[[N_0]]=0$ and the encoding of any other node $N_j$ being $[[N_j]]=2^k[[N_i]]+2^{k-1}$ where $N_j$ is the $k^{th}$ child of $N_i$, k being 1 if $N_j$ is a first child;
    assigning a counter to the node to be encoded, the counter counting a number of steps from the root node to the node to be encoded along a path which includes any earlier sibling nodes of each node on the path;
    assigning an index into a data structure storing a set of indicative set nodes, the index indicating which node of the indicative set nodes corresponds to the node to be encoded; and
    outputting the counter and the index as a key pair.

20. The method of claim 19, wherein the key pair is a key to a hash table.

21. The method of claim 19, wherein the indicative set nodes are nodes that have no children nodes and are the last sibling nodes.

22. The method of claim 19, further comprising decomposing the encoding to construct a path from an encoded node to its root node.

23. The method of claim 22, wherein the decomposition is performed using a sequence decomposition function S of the form:

$$S(\beta) = \begin{cases} 0 & \text{if } \beta = 0 \\ \beta, S\left(\frac{\beta}{2}\right) & \text{if } \beta \text{ even} \\ \beta, S\left(\frac{\beta-1}{2}\right) & \text{if } \beta \text{ odd} \end{cases}$$

where $\beta$ represents the numerical value of the encoding.

24. A decomposition method comprising:
  receiving a user selected node of a tree structure;
  with a processor, retrieving an encoding for the node from memory, each node of the tree having a unique numerical encoding, a root node $N_0$ of the tree structure having a fixed encoding value of $[[N_0]]=0$, and any other node $N_j$ of the tree structure having an encoding value which is a function of an encoding value of its parent node and an integer k, where $N_j$ is the $k^{th}$ child of the parent node $N_i$, the function assigning the encoding value to the node being $[[N_j]]=2^k[[N_i]]+2^{k-1}$; and
  decomposing the encoding with a decomposition function which identifies a path from the node to a root node of the tree.

25. A system comprising memory which stores instructions for performing the method of claim 24 and a processor in communication with the memory for executing the instructions.

26. The decomposition method of claim 24, wherein the decomposition is performed using a sequence decomposition function S of the form:

$$S(\beta) = \begin{cases} 0 & \text{if } \beta = 0 \\ \beta, S\left(\frac{\beta}{2}\right) & \text{if } \beta \text{ even} \\ \beta, S\left(\frac{\beta-1}{2}\right) & \text{if } \beta \text{ odd} \end{cases}$$

where $\beta$ represents the numerical value of the encoding.

27. The method of claim 24, wherein the tree structure is a representation of an extensible markup language document.

* * * * *